Dec. 2, 1941. W. C. MURRAY 2,264,674
CONVEYER
Filed Oct. 22, 1940 2 Sheets-Sheet 1
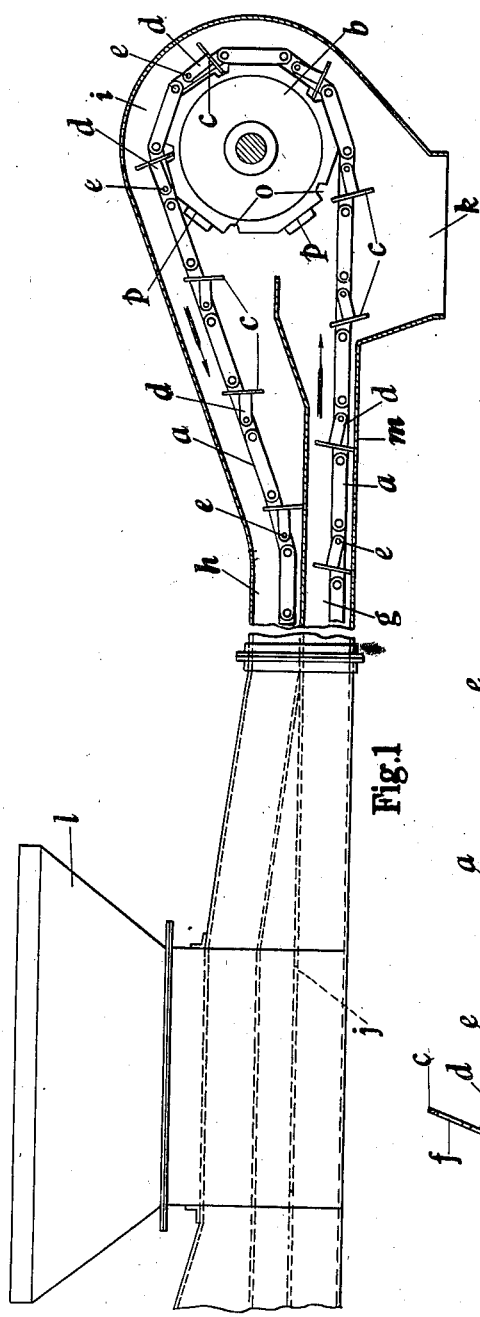
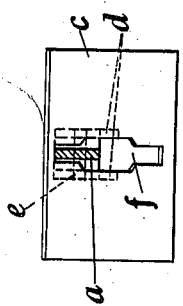
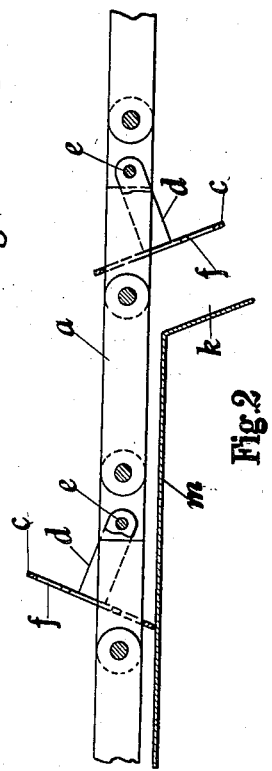
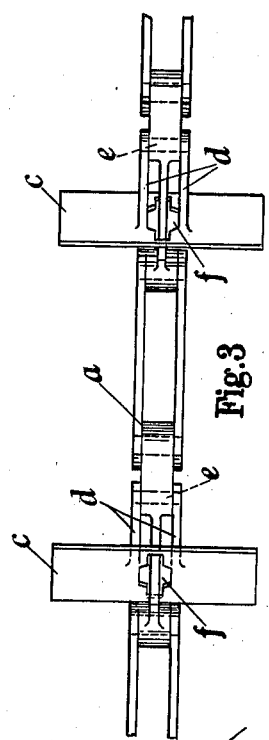
Inventor,
W. C. Murray
By: Glascock, Downing & Seebold
Attys.

Dec. 2, 1941.     W. C. MURRAY     2,264,674
CONVEYER
Filed Oct. 22, 1940     2 Sheets-Sheet 2

Patented Dec. 2, 1941

2,264,674

UNITED STATES PATENT OFFICE 2,264,674

CONVEYER

William Cameron Murray, Oldbury, England, assignor to New Conveyor Company Limited, Oldbury, England Application October 22, 1940, Serial No. 362,284
In Great Britain October 31, 1939

1 Claim. (Cl. 198—170)

This invention relates to conveyers for powdered, granular or other material, and has for its object to provide an improved conveyer of the kind in which flights are pivoted at intervals to an endless carrier, and are adapted to move or convey the material through a passage between charging and discharging positions.

The invention comprises a conveyer of the kind aforesaid having flights which are pivoted to the carrier and are provided with slots through which adjacent parts of the carrier extend, the slots being closed at each end, and being adapted to permit pivotal movements of the flights relatively to the carrier.

In the accompanying sheets of explanatory drawings:

Figure 1 is a part sectional side elevation of a horizontal conveyer embodying the invention.

Figures 2, 3 and 4 are respectively a sectional side elevation, a plan and a sectional end elevation illustrating to a larger scale than Figure 1 a part of the carrier and some of the flights shown in the latter figure.

Figure 5:
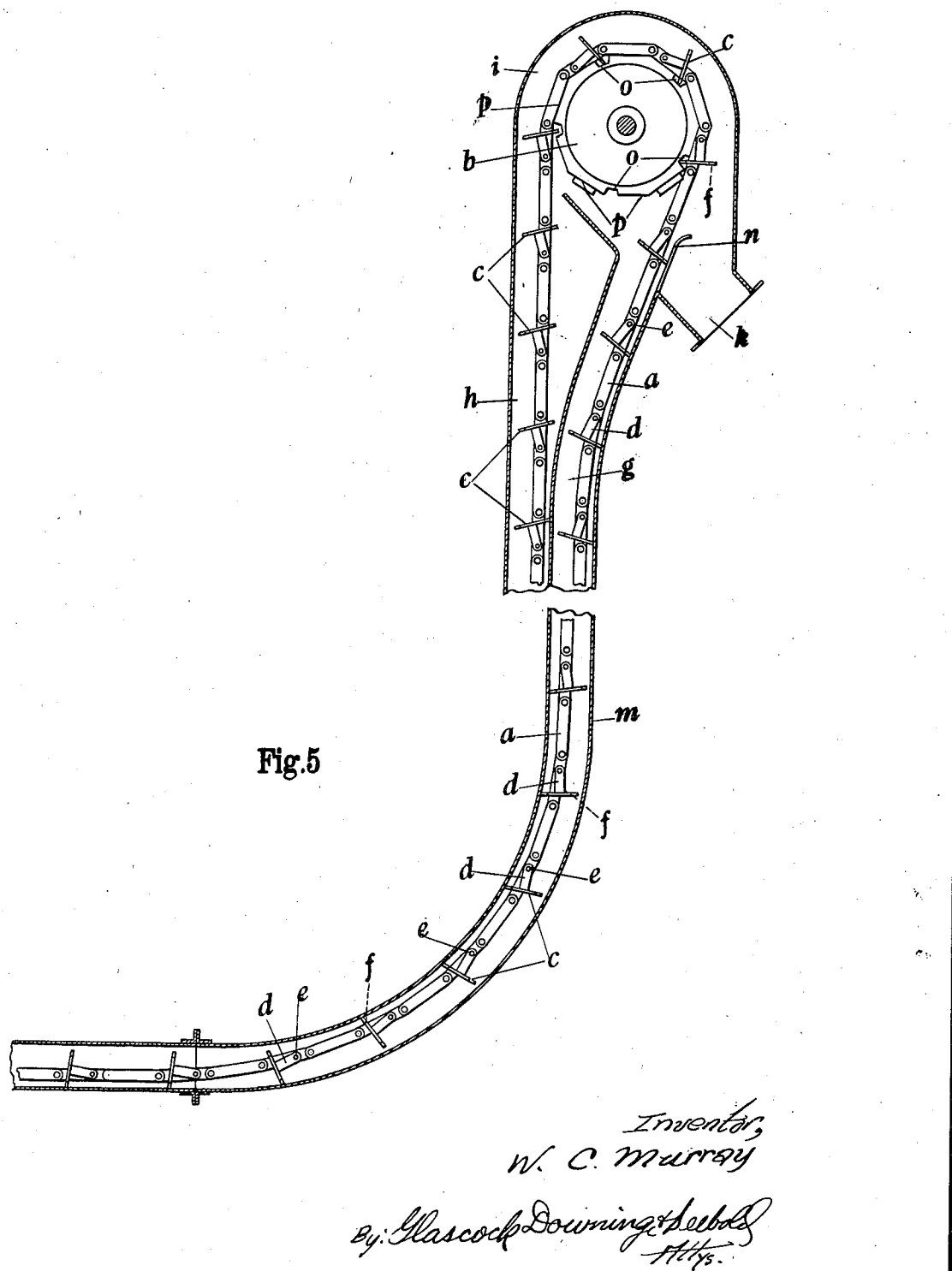
Figure 5 is a view similar to Figure 1 illustrating the invention applied to a conveyer having horizontal and vertical portions.

In carrying the invention into effect as shown in Figures 1 to 4, I employ a flexible carrier $a$ in the form of an endless chain which is supported and movable in the direction of the arrows (Figure 1) by end sprockets as $b$ and at intervals along the carrier I pivot to it a plurality of flights $c$ in the form of plates. Preferably the carrier $a$ consists as shown of a plurality of links pivoted together. Each flight $c$ is formed or provided on its leading side i. e. the side facing in the direction of movement of the carrier $a$, with a pair of outwardly projecting parts in the form of arms $d$ which are situated at opposite sides of the carrier, the pivotal connection between the flight and carrier being effected by a pin $e$ passing through the outer ends of the arms on the flight and through the carrier. Alternatively only one such arm may be formed or provided on each flight. Also each flight $c$ is formed with a slot $f$ which is situated at right angles to the pivot pin $e$, and through which the adjacent part of the carrier $a$ extends. This slot $f$ is closed at each end and permits a limited amount of pivotal movement of the flight $c$ relatively to the carrier $a$.

The passage $g$ (hereinafter termed the transfer passage) through which the flights $c$ are adapted to move or carry the powdered, granular or other material between charging and discharging positions contains the operative part of the carrier $a$ and the corresponding flights. Preferably and as shown another passage $h$ is provided for accommodating the inoperative or return part of the carrier $a$ and its flights $c$, the two passages being interconnected at their ends by housings as $i$ containing the end sprockets as $b$ of the carrier.

At any convenient positions the transfer passage $g$ is provided with a charging opening $j$ and a discharge opening $k$ for the material to be moved or carried along the passage by the flights $c$, the latter being each of corresponding shape as and approximately equal in area to the cross section of the passage. The material to be conveyed is supplied to the charging opening $j$ from a hopper $l$.

The transfer passage $g$ may be arranged in a horizontal, vertical or inclined position, or it may have intercommunicating parts arranged in any of these positions.

When the transfer passage $g$ is arranged horizontally, as shown in Figure 1, or slightly inclined to the horizontal, the discharge opening $k$ is provided in or at one end of the base $m$ of the passage, and the flights $c$ situated in the passage are held in operative positions with their lower edges pressed against the base of the passage by contact of the carrier $a$ with the lower ends of the slots $f$ in the flights, the arrangement being such that upon reaching the discharge opening the flights swing downwardly under the action of gravity until arrested by contact of the carrier with the upper ends of the slots in the flights, the resulting impacts causing any material adhering to the flights to be removed.

When the transfer passage $g$ is arranged wholly or partly in a vertical position as shown in Figure 5, or in a position slightly inclined to the vertical, the discharge opening $k$ may be provided at the upper end of the front wall $m$ of the passage which may be inclined outwardly at its upper end. The flights $c$ situated in the passage $g$ are held in operative inclined positions with their outer edges pressed against the front wall of the passage by contact of the carrier $a$ with the outer ends of the slots $f$ in the flights. For enabling the flights $c$ to be retained by the carrier $a$ in their inoperative positions during their movement past at least the greater part of the discharge opening $k$, guide strips as $n$ are provided at the upper end of the front wall $m$ of the passage $g$, these guide strips forming in effect continuations of the said wall.

After passing the discharge opening $k$ in either of the examples above described, the flights $c$ pass around the adjacent end sprocket $b$ into the return passage $h$ which accommodates the inoperative part of the carrier $a$.

The end sprockets $b$ are provided with flats $p$ or are otherwise shaped to serve as guides for the carrier $a$, and are provided with recesses $o$ for accommodating the adjacent parts of the flights $c$.

By virtue of the slots $f$ in the flights $c$ and the connections $d$, $e$ between the carrier $a$ and the flights, the carrier is permitted to move from one side of the transfer passage $g$ to the other in negotiating or passing between bends such as that shown in the lower part of Figure 5, in this passage without imposing undue strain on the flights and without coming into contact with the walls of the passage.

By this invention I am able to convey powdered, granular or other material in any direction between charging and discharging positions without risk of injury to the materials, or of binding of the flights in the transfer passage.

Having thus described my invention what I claim as new and desire to secure by Letters Patent is:

A conveyer for powdered, granular or other material, comprising the combination of a transfer passage, an endless carrier extending through the passage, and flights pivoted at intervals to the carrier on axes spaced from the flights for moving the material through the passage between charging and discharging positions, the flights being provided with slots through which adjacent parts of the carrier extend and which are closed at each end so that the flights are capable of pivotal movements relatively to the carrier but prevent contact between the carrier and passage.

WILLIAM CAMERON MURRAY.